US008271523B2

(12) United States Patent
Hattori

(10) Patent No.: US 8,271,523 B2
(45) Date of Patent: Sep. 18, 2012

(54) COORDINATION SERVER, DATA ALLOCATING METHOD, AND COMPUTER PROGRAM PRODUCT

(75) Inventor: Masakazu Hattori, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 740 days.

(21) Appl. No.: 12/361,708

(22) Filed: Jan. 29, 2009

(65) Prior Publication Data
US 2009/0198657 A1 Aug. 6, 2009

(30) Foreign Application Priority Data
Feb. 1, 2008 (JP) .................................. 2008-22761

(51) Int. Cl.
*G06F 7/00* (2006.01)
*G06F 17/30* (2006.01)
(52) U.S. Cl. ........................ 707/770; 707/803
(58) Field of Classification Search .................. 707/770, 707/803
See application file for complete search history.

(56) References Cited

U.S. PATENT DOCUMENTS
2008/0059507 A1* 3/2008 Najork .......................... 707/102

FOREIGN PATENT DOCUMENTS
| JP | 06-139119 | | 5/1994 |
| JP | 06139119 | * | 5/1994 |
| JP | 06-314299 | | 11/1994 |

* cited by examiner

*Primary Examiner* — Jacob F. Bétit
*Assistant Examiner* — Christy Lin
(74) *Attorney, Agent, or Firm* — Turocy & Watson, LLP

(57) ABSTRACT

In a structure where a table is partitioned into multiple databases according to a certain partitioning method, a coordinator server changes allocation information that is used to determine a database into which each of data records should be registered when an allocation change command is issued. The coordinator server stores therein allocation history information, which is the allocation information used before the change. When an entry request to make an entry of a new data record from a client, a database to enter the new data record is determined based on the stored allocation history information and the changed allocation information, and an entry request is sent to a database server having the determined database.

9 Claims, 9 Drawing Sheets

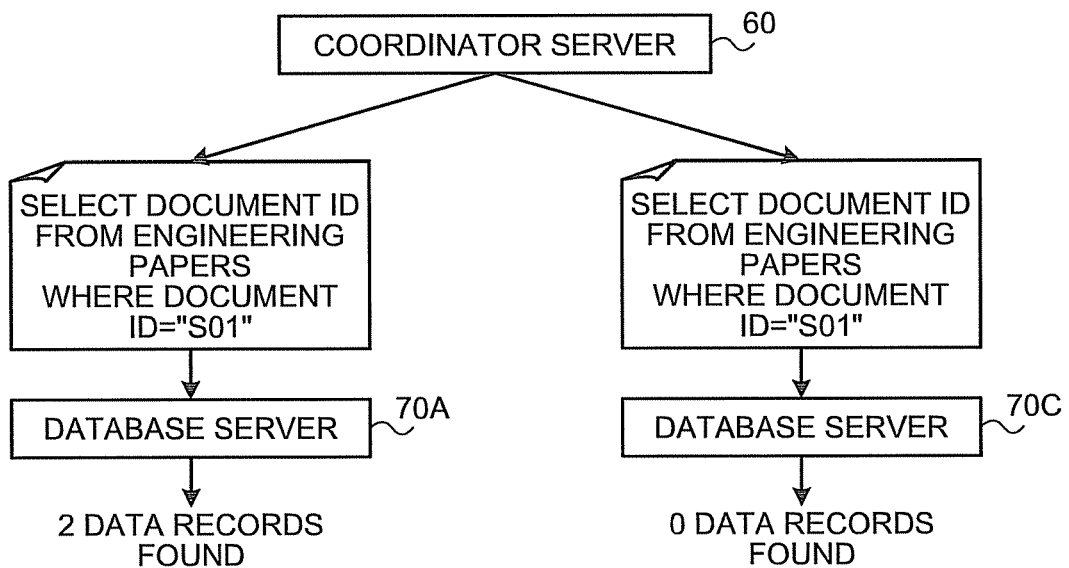
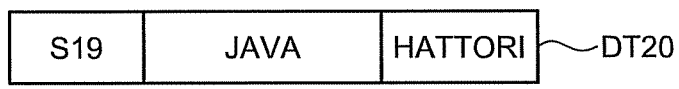
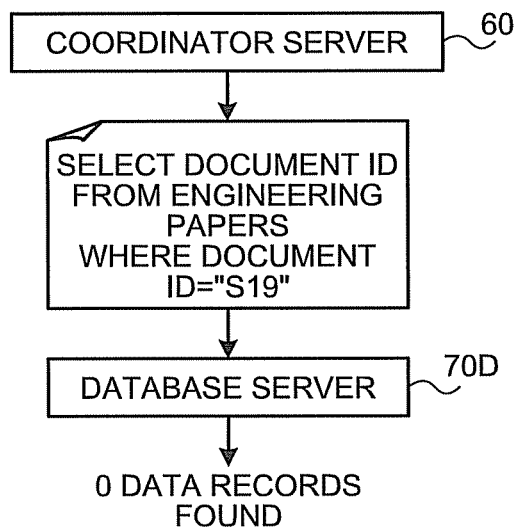

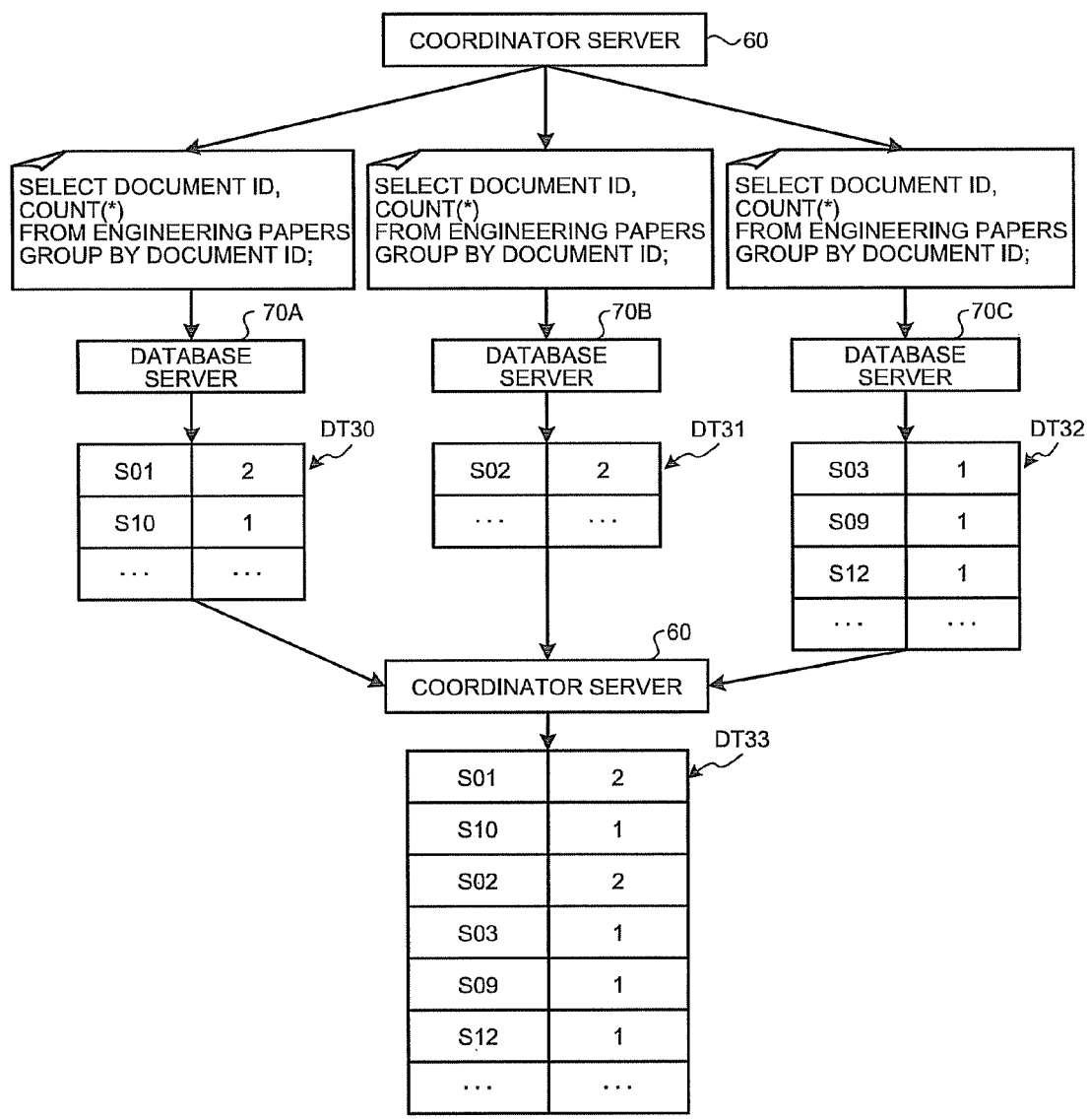

COORDINATION SERVER, DATA ALLOCATING METHOD, AND COMPUTER PROGRAM PRODUCT

CROSS-REFERENCE TO RELATED APPLICATIONS

This application is based upon and claims the benefit of priority from the prior Japanese Patent Application No. 2008-22761, filed on Feb. 1, 2008; the entire contents of which are incorporated herein by reference.

BACKGROUND OF THE INVENTION

1. Field of the Invention

The present invention relates to a coordination server that is connected to database servers each having a database storing data therein to form a distributed database and allocates data to the databases, as well as a data allocating method and a computer program product thereof.

2. Description of the Related Art

A distributed database having multiple databases has been developed to deal with enormous amounts of data. In such a distributed database, the data needs to be divided and allocated to different databases. Key range partitioning and hash partitioning are well-known examples of data allocating methods (see JP-A H6-139119 and H6-314299 (KOKAI), for example). In the key range partitioning and hash partitioning, a single column value or multiple column values of a table may be adopted.

In the key range partitioning, the value of the key that is to be used for the partitioning is predetermined, and data is divided and stored in a database to which this value is assigned. By dividing the data storage location, the data searching process can be executed in a parallel manner, and its throughput can be increased. For example, when dealing with a large amount of sales data, the data is stored in different databases (disks) by using "month" of the date of the data as a key so that the throughput in the parallel processing can be improved.

By partitioning the data in this manner, the load may become concentrated on a certain database, but an inefficient operation can be avoided because no irrelevant database would be accessed in a data search from range criteria defined in the target column. Furthermore, in a search including a natural join from the target column, no joining across different databases is required, and thus the performance can be greatly improved.

In the distributed database, however, if the data partitioning is out of balance, a heavy load may be concentrated on a specific database during the search. This lowers the effectiveness of the partitioning. Because of the changing tendency of the data entered into the databases, the data sizes of the databases often become unbalanced. It is therefore difficult to avoid such an imbalance in accordance with predetermined data partitioning rules. For this reason, improved partitioning methods have been suggested, for example, such as a method with which hashes are changed to dynamically change key ranges. With those methods, however, the data has to be relocated in accordance with the changes of the key ranges and hashes, which actually increases the processing load.

SUMMARY OF THE INVENTION

According to one aspect of the present invention, a coordinator server includes a changing unit that changes, at a time of issuance of an allocation change command, allocation information used to determine a database into which each of data records should be registered when a table including the data records is partitioned into a plurality of the databases according to a predetermined partitioning method; a history storage unit that stores allocation history information which is the allocation information used before a change of the allocation information; a receiving unit that receives an entry request from a client to make an entry of a new data record; a determining unit that determines a database to store the new data record in response to the entry request, by use of the allocation history information stored in the history storage unit and the allocation information after the change; and a transmitting unit that transmits an entry request to make an entry of the new data record to a database server including the database determined by the determining unit.

According to another aspect of the present invention, a data allocating method implemented in a coordinator server that includes a history storage unit that stores allocation history information which is the allocation information used before a change of the allocation information and used to determine a database into which each of data records should be registered when a table including the data records is partitioned into a plurality of the databases according to a predetermined partitioning method, the method includes changing the allocation information at a time of issuance of an allocation change command; receiving an entry request from a client to make an entry of a new data record; determining a database to store the new data record in response to the entry request, by use of the allocation history information stored in the history storage unit and the allocation information after the change; and transmitting an entry request to make an entry of the new data record to a database server including the determined database.

A computer program product according to still another aspect of the present invention causes a computer to perform the method according to the present invention.

BRIEF DESCRIPTION OF THE DRAWINGS

FIG. 6 is a diagram for showing an example of a new data record that is to be entered;

FIG. 7 is a diagram for showing an example of a search request issued to the database servers 70A and 70C by the coordinator server 60 according to the embodiment;

FIG. 8 is a diagram for showing an example of a new data record that is to be entered;

FIG. 9 is a diagram for showing an example of a search request issued to the database server 70D by the coordinator server 60 according to the embodiment;

FIG. 11 is a diagram for showing an example of a search request (SQL) for searching for a data record;

FIG. 12 is a diagram for showing an example of a processing procedure of searching by use of the SQL of FIG. 11 according to the embodiment.

DETAILED DESCRIPTION OF THE INVENTION

Figure 1:
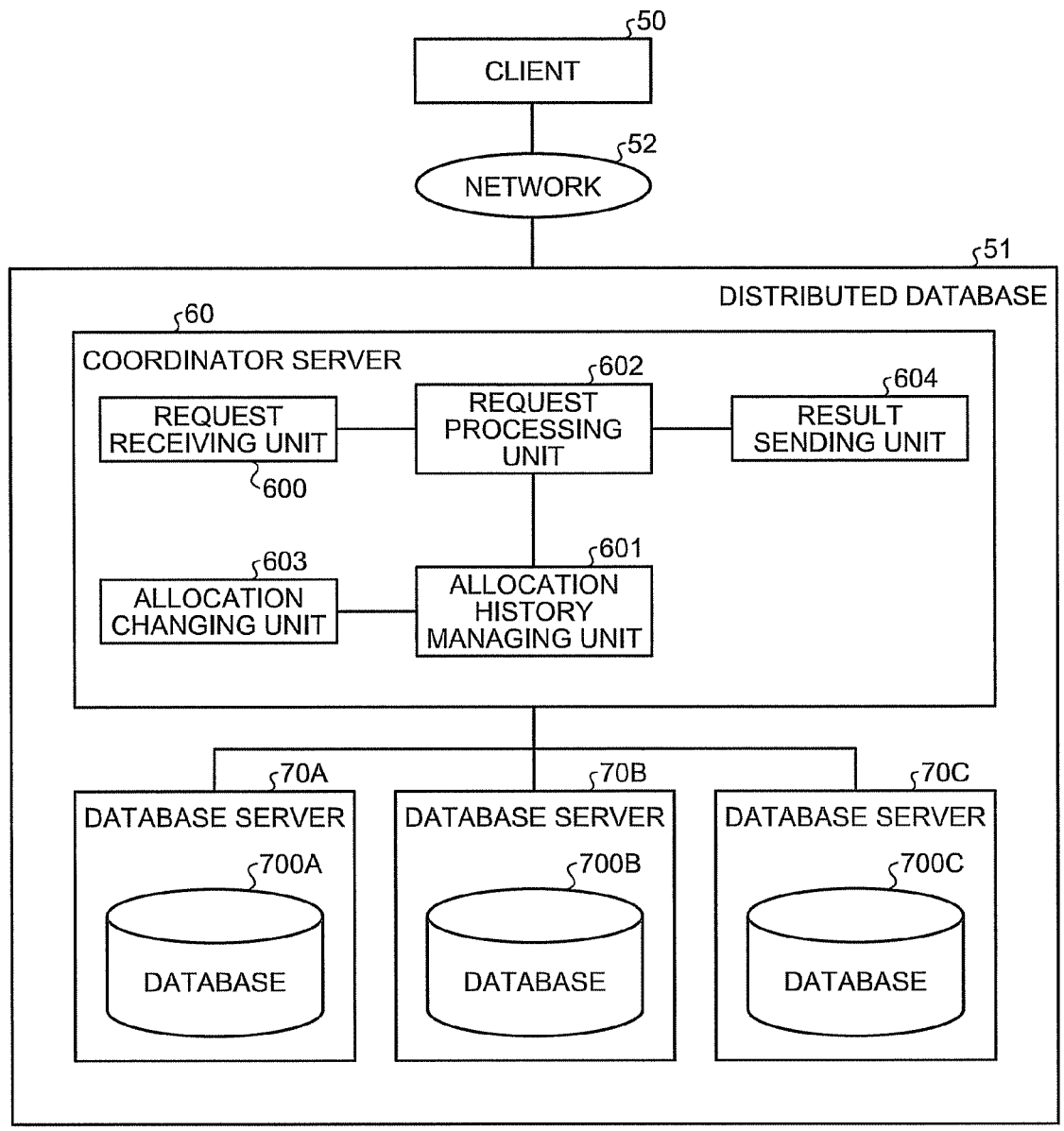
FIG. 1 is a diagram for showing an example structure of a distributed database system according to an embodiment of the present invention.

FIG. 1 is a diagram for showing an example structure of a distributed database system according to an embodiment of the present invention. The distributed database system includes a client computer (hereinafter, "client") 50 on which an application program is executed and a distributed database 51, with the two units connected by way of a network 52. The distributed database 51 includes a single coordinator server 60 and multiple database servers 70A to 70C. The network 52 may be a local area network (LAN), an intranet, the Ethernet (registered trademark), or the Internet.

When receiving a process request from the client 50, the coordinator server 60 sends a process request to the database servers 70A to 70C in response. Then, the coordinator server 60 receives the result of the process performed in response to the process request from the database servers 70A to 70C, based on which the coordinator server 60 suitably sends the result data to the client 50.

The database server 70A includes a database 700A that stores data therein, and obtains from the database 700A data records that correspond to the process request received from the coordinator server 60. Then, the database server 70A suitably processes the data set consisting of these data records, and sends the resultant data as a result of the process to the coordinator server 60. The database server 70B includes a database 700B that stores data therein, and realizes the same function as the database server 70A. The database server 70C includes a database 700C that stores data therein, and realizes the same function as the database server 70A. When the database servers 70A to 70C do not particularly need to be distinguished from one another, they are simply referred to as a database server 70. Similarly, when the databases 700A to 700C do particularly not need to be distinguished from one another, they are simply referred to as a database 700.

Now, the hardware structures of the client 50, the coordinator server 60, and the database server 70 are explained. Each of the client 50, the coordinator server 60, and the database server 70 has a hardware structure of a regular computer, including a control device that controls the entire device such as a central processing unit (CPU), memory devices that store therein various types of data and programs such as a read only memory (ROM) and a random access memory (RAM), external memory devices that store therein various types of data and programs such as a hard disk drive (HDD) and a compact disk (CD), a display device that displays information thereon, input devices with which the user inputs various process requests such as a keyboard and a mouse, a communication control device that performs communications with an external computer by way of the network 52, and a bus that connects these components.

Figure 2:
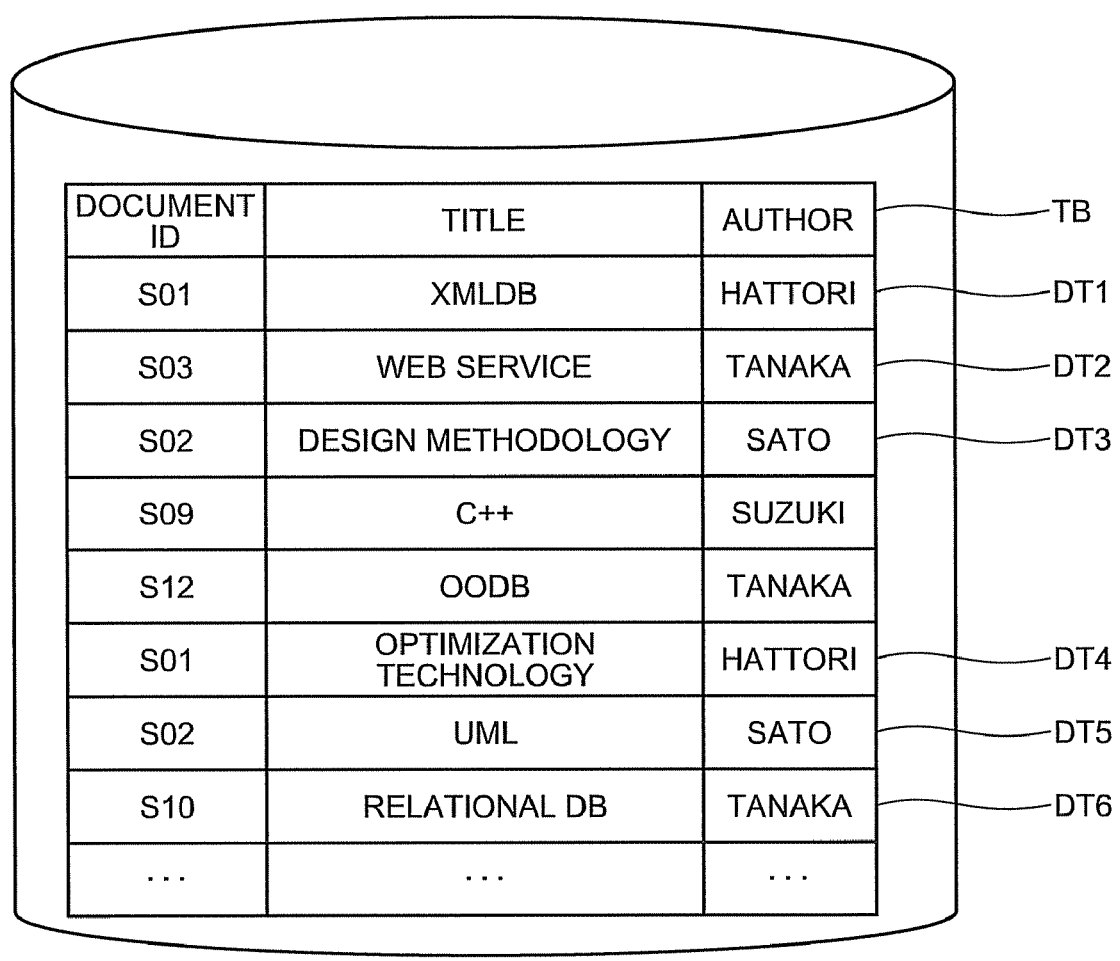
FIG. 2 is a diagram for showing an example of data that is dealt with in the system according to the embodiment.

Next, the data that is dealt with in the present embodiment is explained below. FIG. 2 is a diagram for showing an example of data that is dealt with in the embodiment. In a table TB, data representing bibliographic data of engineering research papers is stored record by record. Each record of the data has three columns for the document ID, the title, and the author. In this data, research papers are grouped in accordance with their document IDs, and thus the data may have records having the same document ID for different papers.

When only a small amount of data is stored, the table TB placed in a single database can conduct a search through the data and return the result within a suitable response time from a practical standpoint. If the number of data records increases and the data size of the table TB expands, however, it is difficult to maintain the practical length of the response time with a single database. Thus, the data should be partitioned and allocated to several databases to maintain the practical length of the response time.

Figure 3:
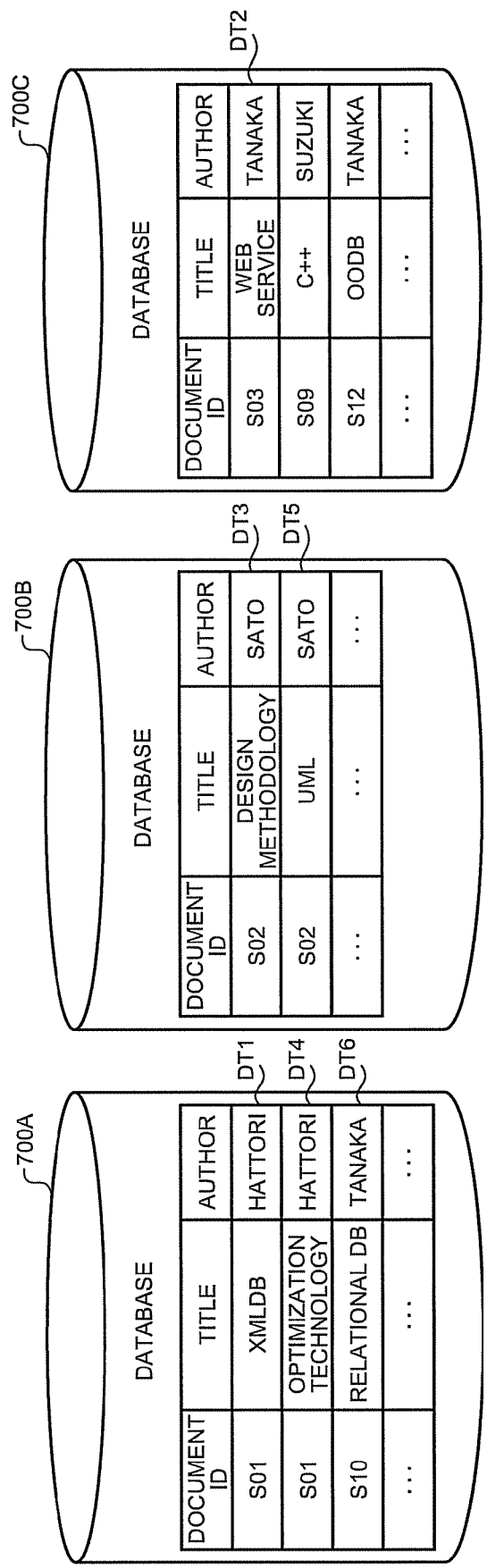
FIG. 3 is a diagram for explaining an example of data divided into databases 700A to 700C in units of data records without overlaps by partitioning a table TB according to the embodiment.

FIG. 3 is a diagram for explaining an example of data divided and stored in the databases 700A to 700C in units of data records with no overlaps by partitioning the table TB. In this example, the table TB is horizontally partitioned. The data may be partitioned by techniques such as the key range partitioning and hash partitioning. The hash partitioning technique is adopted here. A hash function on which the hash partitioning is based is applied to a specific column (target column) among the columns of the data. The target column is preset by the user. In the example of FIG. 3, the data includes columns for a document ID, a title, and an author, among which the document ID is set to a target column. The hash function applied to this document ID is described as hash function 1[document ID]. The hash function 1 [document ID] may be expressed as equation (1).

$$\text{hash function 1[document ID]} = (\Sigma_{C \in character\ strign} C)\% \text{ hash size} \quad (1)$$

This hash function [document ID] denotes that, when the document ID of the data record that is to be entered is declared as a character string such as VARCHAR(20), character codes assigned to the characters are added up, and then divided by the hash size. The hash size is originally set to "3", which is the number of databases 700A to 700C.

For example, the hash function 1[document ID] applied to the document IDs [S01], [S02], and [S03] produces the following calculation results.

hash function 1["S01"]=0
hash function 1["S10"]=0
hash function 1 ["S02"]=1
hash function 1 ["S03"]=2

The hash values "0" to "2", which are obtained as the calculation results of the hash function 1[document ID] establish a one-to-one correspondence with the databases 700A to 7000, or in other words, with the database servers 70A to 70C. For example, it is assumed that the database server 70A corresponds to the hash value "0", the database server 70B corresponds to the hash value "1", and the database server 70C corresponds to the hash value "2". Thus, when the data DT1 to DT6 of FIG. 2 is dealt with, the data DT1, DT4, and DT6 is allocated to the database 700A, the data DT3 and DT5 is allocated to the database 700B, and the data DT2 is allocated to the database 7000, as illustrated in FIG. 3.

By performing the hash partitioning in accordance with the hash function 1[document ID], the data stored in the databases 700A to 700C is clustered by the "document ID" column.

Next, various functions realized when the coordinator server 60 executes programs stored in any memory device or external memory device are explained below with reference to FIG. 1. First, the actual units that perform the functions realized in the coordinator server 60 are described. The coordinator server 60 includes a request receiving unit 600, an allocation history managing unit 601, a request processing unit 602, an allocation changing unit 603, and a result sending unit 604. The request receiving unit 600, the request processing unit 602, the allocation changing unit 603, and the result sending unit 604 are actually generated on a memory device (the RAM, for example) when the CPU executes the programs. The allocation history managing unit 601 is stored, for example, in an external memory device.

The allocation changing unit 603 changes the hash function by using a management tool when an allocation change command is issued. The allocation change command is issued by the user by way of an input device when it is determined from a judgment function that the sizes of the total data stored in the databases 700A to 700C become out of balance, or when a new database is added, for example. The management tool is a specific program module stored in a memory device or an external memory device. When the hash function is changed, the allocation changing unit 603 stores in the allocation history managing unit 601 allocation history information, which represents the hash function and a parameter used before the change of the hash function or, in other words, at the last entry, as well as allocation information, which represents a hash function and a parameter after the change (i.e., the latest hash function and parameter).

The request receiving unit 600 receives from the client 50 a process request such as an entry request to enter a new data record and a search request to search for a data record that matches criteria. When the process request received by the request receiving unit 600 is to enter a new data record, the request processing unit 602 performs a calculation based on all the allocation history information and the allocation information stored in the allocation history managing unit 601, and selects a database server 70 to store the data record in accordance with the calculation result. Then, together with this data record, the request processing unit 602 sends an entry request to the selected database server 70 to make an entry of the target data record. If the process request received by the request receiving unit 600 is a search request to search for data, the request processing unit 602 sends a search request to the database server 70, and receives the search result obtained by the database server 70 in response to a search result request. Then, the request processing unit 602 processes this result suitably by merging and combining to generate result data.

The result sending unit 604 sends the result data generated by the request processing unit 602 to the client 50.

Figure 4:
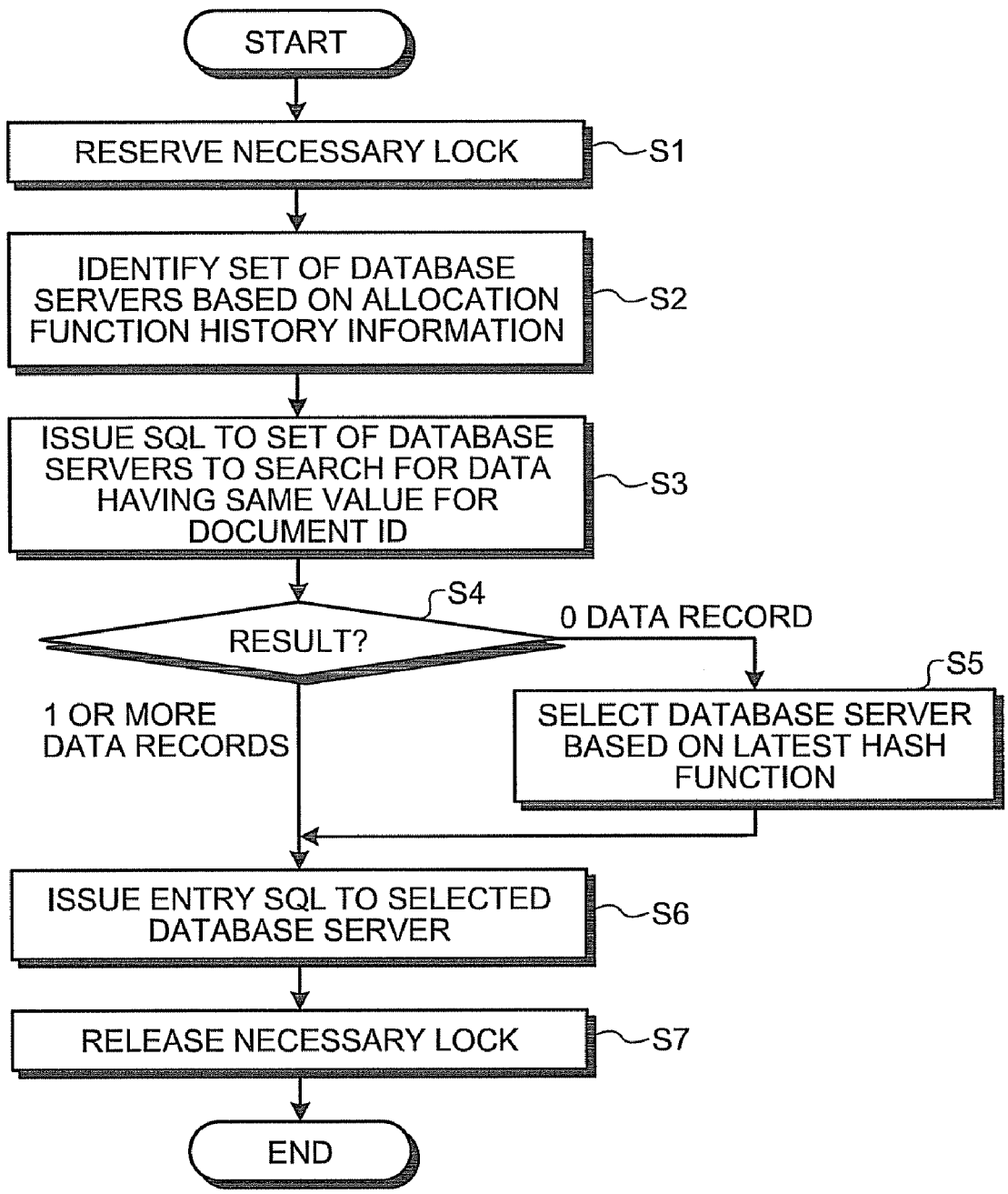
FIG. 4 is a flowchart of the procedure of a data entry making process performed by a coordinator server 60 according to the embodiment.

The procedure of the data entry making process performed by the coordinator server 60 according to the embodiment is explained below, with reference to FIG. 4. When receiving an entry request from the client 50 to enter a new data record, the coordinator server 60 first reserves a necessary lock (step S1). More specifically, because each data record is subjected to horizontal partitioning in accordance with its document ID, the coordinator server 60 calculates a hash value for the new data record by use of the value of the document ID, and applies a lock to a lock point of any slave that has this hash value so that an exclusive lock is placed on an entry of any other data record having the same document ID. Then, the coordinator server 60 performs calculations onto the value of the document ID of the target data record by use of all the hash functions and parameters indicated by the allocation history information and the allocation information stored in the allocation history managing unit 601, and acquires a set of possible hash values calculated from the document ID (step S2). Because each of the hash values establishes a one-to-one correspondence with one of the database servers, a set of database servers 70 (at least one of the database servers 70A to 70C) can be identified. In other words, any database server 70 that possibly stores therein data having the same value of the document ID as that of the new data record can be determined in accordance with the hash value. Thereafter, the coordinator server 60 issues a search request (SQL) to the set of the determined database servers 70 to search for data having the same value of the document ID as that of the new data record (step S3).

When the process result sent by the database server 70 in response to the process request shows that 0 records are found (0 at step S4), the coordinator server 60 calculates the hash value by the latest hash function, and selects a database server 70 (one of the database servers 70A to 70C) to store the data record (step S5).

When the process result sent by the database server 70 in response to the process request shows that one data record or more is found (1 or more at step S4), the coordinator server 60 selects the database server 70 (one of the database servers 70A to 70C) that has sent this process result. Then, the coordinator server 60 issues an entry request (entry SQL) to the selected database server 70 to make an entry of the new data record (step S6). Thereafter, the coordinator server 60 releases the lock (step S7).

A data entry that is made after a database server 70D having a database 700D is added to the distributed database system is now explained. In such a situation, the allocation changing unit 603 changes the hash function and parameter used for the data entry, and stores in the allocation history managing unit 601 the allocation history information representing the hash function and the parameter before the change, and the allocation information representing the hash function and the parameter after the change. It is assumed here that the hash function adopted for the data entry before the change is the same as the hash function 1[document ID] discussed earlier, and that the hash size of the hash function 1[document ID] is to be changed to "4". Thus, the allocation history managing unit 601 now stores therein the allocation history information (allocation history information 1) representing the hash function 1[document ID] and the hash size "3", and the allocation information representing the hash function 1[document ID] and the hash size "4".

Figure 5:
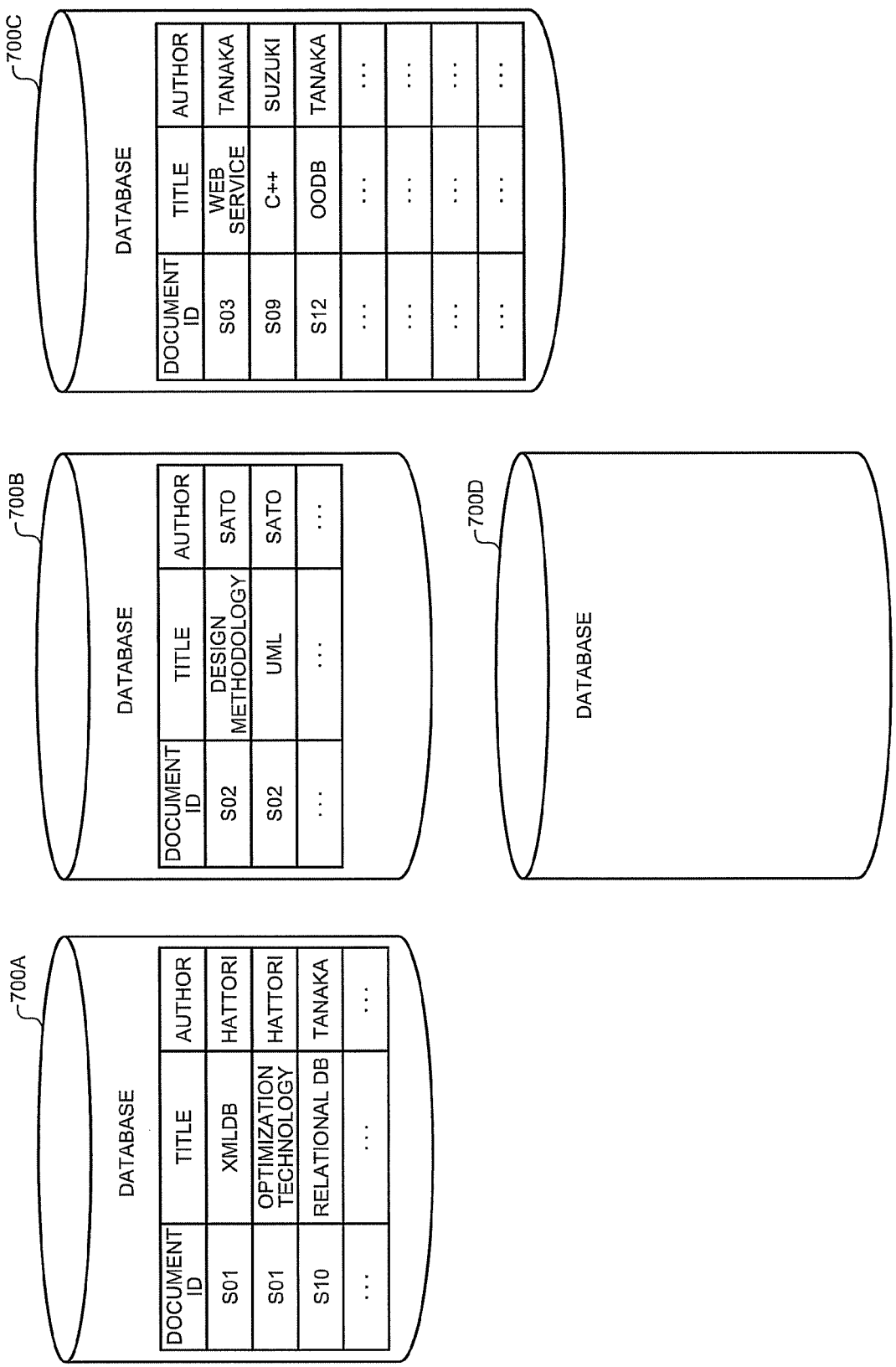
FIG. 5 is a conceptual illustration of the distributed database according to the embodiment, after a database server 70D is newly added.

FIG. 5 is a conceptual diagram of the distributed database after the database server 70D is newly added. A situation in which the coordinator server 60 receives an entry request from the client 50 to make an entry of new data DT 10 as indicated in FIG. 6. In response, the coordinator server 60 performs the operations at steps S1 and S2 mentioned above, executing the calculation by use of the hash function 1[document ID] and the hash size "3" included in the allocation history information 1 and also the calculation by use of the hash function 1[document ID] and the hash size "4" included in the allocation information. The coordinator server 60 acquires a hash value "0" from the calculation using the allocation history information 1, and a hash value "2" from the calculation using the allocation information.

The hash values establish a one-to-one correspondence with the database servers 70, and thus the coordinator server 60 identifies the database server 70A in correspondence with the hash value "0" and the database server 70C in correspondence with the hash value "2" at step S3. Then, the coordinator server 60 issues a search request (SQL) to the identified database servers 70A and 70C to search for data having the same document ID as that of the new data record. This SQL may be described as follows:

```
SELECT      Document ID
FROM        Engineering Papers
WHERE       Document ID = "S01"
```

FIG. 7 is a diagram for showing an example of a search request issued to the database servers 70A and 70C by the coordinator server 60. In response to the search request, the database server 70A executes a process. Because two corresponding data records are stored in the database 700A, the database server 70A sends the process result of two data records to the coordinator server 60. In the same manner, the database server 70C executes the process in response to the process request. Because there is no corresponding data in the database 700C, the database server 70C sends the process result of no data to the coordinator server 60.

When receiving the process result from the database servers 70A and 70C, the coordinator server 60 selects the database server 70A to make a data entry at step S6 based on the process result that is received from the database server 70A, showing that one or more corresponding data records are present. Then, the coordinator server 60 issues an entry request (entry SQL) to the database server 70A to make an entry of the new data record. As a result, the data record indicated in FIG. 6 is entered into the database 700A.

Next, a situation in which the coordinator server 60 of the distributed database of FIG. 5 receives an entry request from the client 50 to make an entry of the new data DT20 as indicated in FIG. 8 is explained below. The coordinator server 60 executes the operations at steps S1 and S2 to perform the calculation by using the hash function 1[document ID] and the hash size "3" included in the allocation history information 1 and also perform the calculation by using the hash function 1[document ID] and the hash size "4" included in the allocation information. Then, the coordinator server 60 acquires the hash value "3" as a result of the calculation based on the allocation history information 1, and the hash value "3" as a result of the calculation based on the allocation information.

The database server 70D is selected at step S3 in correspondence with the hash value "3". Thereafter, the coordinator server 60 issues a search request (SQL) to the selected database server 70D to search for data having the same value of the document ID as that of the new data record. This SQL may be described as follows:

```
SELECT      Document ID
FROM        Engineering Papers
WHERE       Document ID = "S19"
```

FIG. 9 is a diagram for showing an example of a search request issued to the database server 70D by the coordinator server 60. The database server 70D executes an operation in response to this search request. Because no corresponding data is stored in the database 700D, the database server 70D sends the process result indicating that no corresponding data is present to the coordinator server 60.

The process result received from the database server 70D shows that there is no corresponding data stored, the coordinator server 60 acquires a hash value at step S5 by performing a calculation based on the latest hash function and selects a database server 70 to enter the data. In this example, the coordinator server 60 performs a calculation by using the hash function 1[document ID] and hash value "4" included in the allocation information, and acquires the hash value "3". The database server that corresponds to this value is the database server 70D. Hence, the database server 70D is selected. The coordinator server 60 therefore issues an entry request (entry SQL) to the selected database server 70D to enter the new data record. As a result, the data DT20 of FIG. 8 is entered into the databases 700D.

Figure 10:
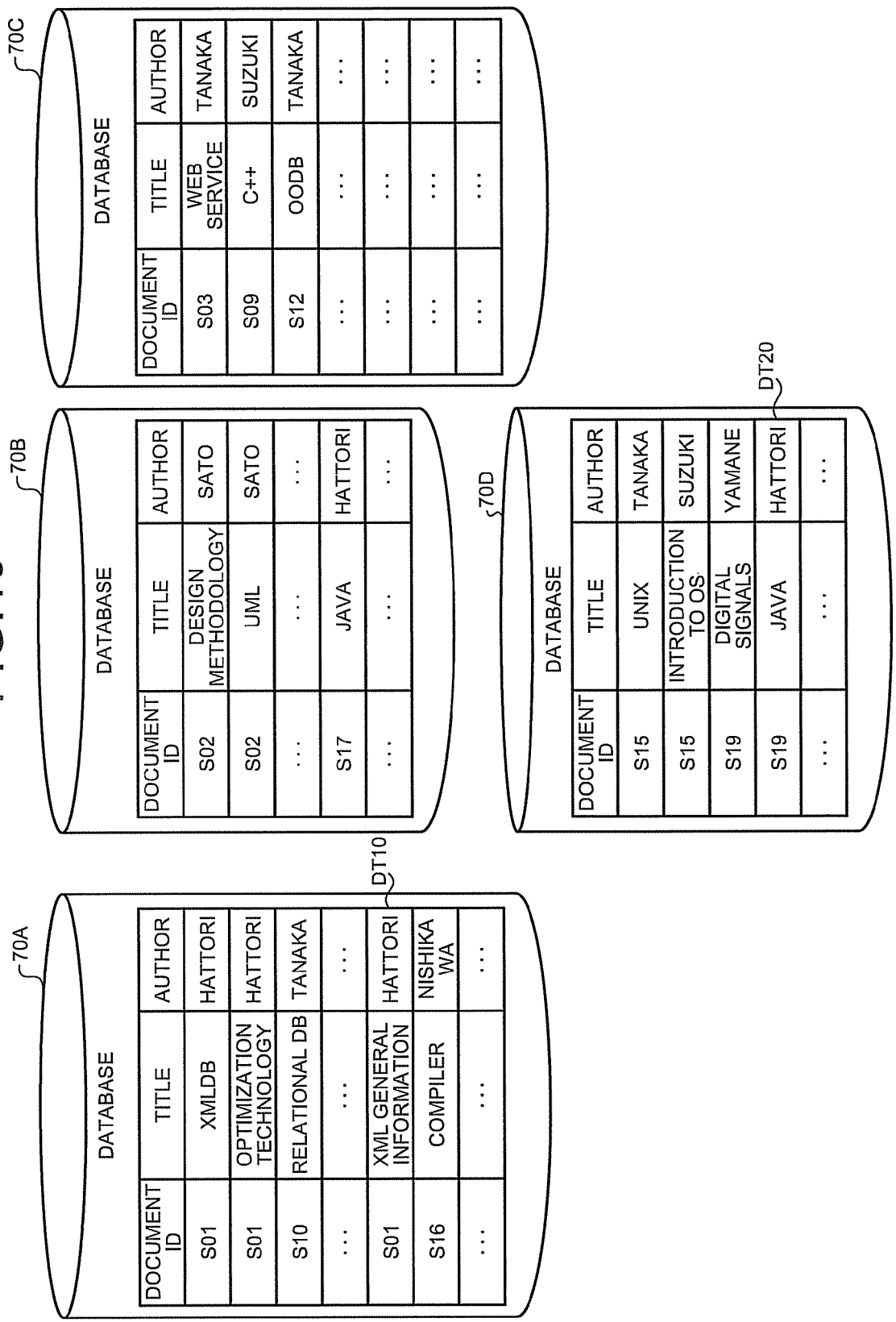
FIG. 10 is a diagram for showing the databases after the data DT 10 of FIG. 6 and the data DT 20 of FIG. 8 are entered and several more data records are added thereafter.

FIG. 10 is a diagram for showing the distributed database after the data DT 10 of FIG. 6 and the data DT 20 of FIG. 8 are entered and several more data records are added thereafter. In such a structure, the total data sizes of the databases 700A to 700D are well balanced. When the balance is achieved in data partitioning, the effect of the partitioning can be enhanced. With the conventional technologies, the total data sizes of the databases often become unbalanced because of changes in the tendency of types of data entered into the databases, and it is difficult to avoid the imbalance by the predetermined data partitioning rules. According to the present embodiment, when a new database server is added by use of a management tool and the hash function and parameters for the data entry are thereby changed, the allocation history managing unit 601 of the coordinator server 60 stores therein the history of the hash function and parameters. Then, the coordinator server 60 selects a database to store a new data record by using the hash function and parameters in the history and the latest hash function and parameters so that data can be partitioned in a balanced manner in accordance with the tendency of the data, without replacing the already stored data. Hence, the processing load can be reduced, while the imbalance of data stored in the databases can be avoided.

The data searching process through the distributed database 51 is now explained. As shown in FIG. 3, it is assumed that the data is partitioned into the data databases 700A to 700C. FIG. 11 is an example of an SQL to conduct a data search. This SQL requests that the data of the technical documents be grouped by the same document ID (GROUP BY), and the number of documents (COUNT) as well as the document ID be returned (SELECT). FIG. 12 is a diagram for showing an example of a processing procedure of searching for data by use of the SQL of FIG. 11. When receiving such an SQL from the client 50, the coordinator server 60 analyzes the syntax of the SQL, and based on the result of the analysis, the coordinator server 60 suitably generates and issues a code to the database server 70 to request a data search. Then, when receiving from the database server 70 the process result data obtained by the database server 70 as a result of executing the code, the coordinator server 60 suitably processes the data and sends the generated result data to the client 50.

The SQL indicated in FIG. 11 requests that the documents be grouped by document IDs (GROUP BY). Meanwhile, the data stored in the databases 700A to 700D of the distributed database 51 are clustered in accordance with the document IDs. After analyzing the SQL in FIG. 11, the coordinator server 60 sends the SQL itself to the database server 70 as a code, as illustrated in FIG. 12. The obtained process results, data DT30 to DT32, are simply merged to generate data DT33, which is sent to the client 50 as the process result.

Figure 13:
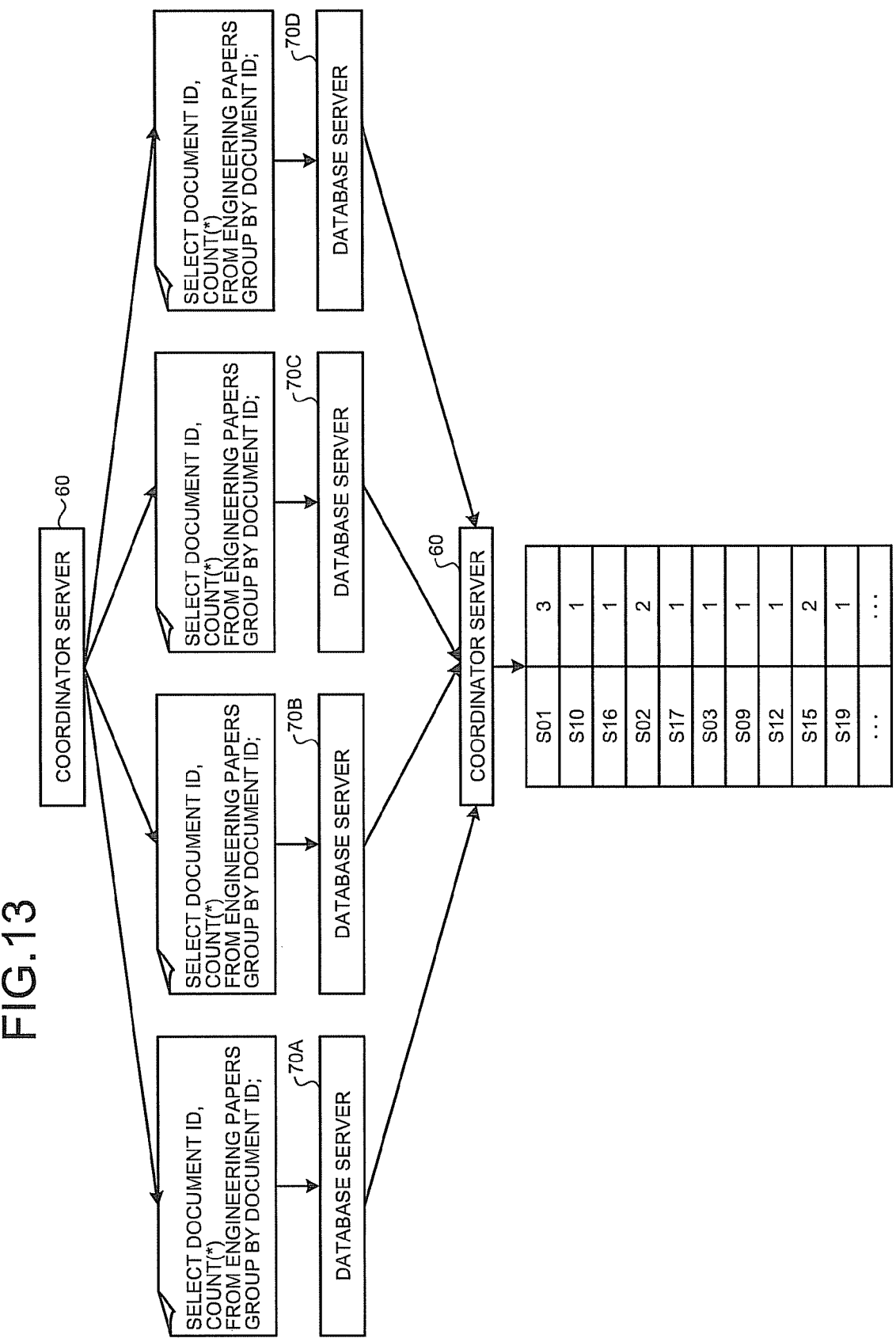
FIG. 13 is a diagram for showing an example of a processing procedure of searching by use of the SQL of FIG. 11 according to the embodiment, from the situation illustrated in FIG. 10.

A data search through the distributed database to which the database server 70D is newly added as illustrated in FIG. 10 is now explained. FIG. 13 is a diagram for showing an example of a processing procedure of searching for data by use of the SQL of FIG. 11 in the situation illustrated in FIG. 10. In the same manner as the above situation, the coordinator server 60 sends the SQL of FIG. 11 to the database server 70, and merges the data as result of the process in response to generate the result data to be sent to the client 50.

With the above structure, a searching process is conducted for data having the same document ID as that of the data record that is to be entered, and thus overhead is slightly increases at the time of data entry. However, the structure speeds up a search that includes a natural join in the target columns, and makes full use of the efficiency of the distributed database.

The program executed by the coordinator server 60 according to the embodiment may be stored in a computer that is connected to a network such as the Internet, and downloaded via the network. The program may be otherwise written and offered in a computer readable recording medium such as a CD-ROM, a flexible disk (FD), a CD-R, a digital versatile disk (DVD) in an installable or executable format. The program offered in this manner coordinator server 60 is loaded onto a main memory (such as a RAM) when the CPU reads the program from the recording medium and executes it. The request receiving unit 600, the request processing unit 602, and the result sending unit 604 explained above in the functional structure are thereby generated on the main memory.

According to the above embodiment, the data is divided with the hash partitioning method, but the partitioning method is not limited thereto. The key range partitioning may method be adopted. Instead of the history of the hash function, the allocation history managing unit 601 stores therein, as a history of the key range, allocation history information indicating the range of the target columns as information of the key range used at the past data entry, and allocation information indicating the latest range of the target columns as information of the key range used at the current data entry.

The data to be entered into the databases is not limited to the types that are mentioned above, or the columns included in the data are not limited to the ones mentioned above. For example, the data may include columns of date and division to which a person belongs. The target columns are also not limited to the ones mentioned above.

If the target column is the date column, ranges of dates are dealt with as the allocation information and allocation history information showing different ranges of the target column, and each range is brought into correspondence with one of the databases 700. When a new data record is to be entered, the request processing unit 602 finds out databases 700 corresponding to the dates indicated in the allocation history information and the allocation information, issues a search request for the data having the same date to the found-out database servers 70, and selects the database 700 to enter the data record in accordance with the number of data records obtained as a result of the search, in the manner same as the above.

According to the present embodiment, the allocation information that indicates the hash function and the parameters after the change (update) is stored in the allocation history managing unit 601 together with the allocation history information. However, the allocation information may be configured to be stored in a storage area of the external memory device different from the allocation history managing unit 601 or in a different memory device.

Furthermore, according to the present embodiment, the allocation changing unit 603 changes the parameters of the hash function, but the hash function itself may be changed. Otherwise, the hash function and the parameters may both be changed.

According to the present embodiment, the structure includes a single coordinator server 60, but may include more than one coordinator. In such a structure, the allocation history information is shared by multiple coordinators. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coordinator server comprising:
a processor;
a memory communicatively coupled to the processor and having stored thereon computer-executable components for implementing the system, including:
   a changing unit configured to change, in response to issuance of an allocation change command, allocation information used to determine a database into which each of data records is registered, wherein a table including the data records is partitioned into a plurality of databases including the database according to a partitioning method;
   a history storage unit configured to store allocation history information which is the allocation information used before a change of the allocation information;
   a receiving unit configured to receive an entry request from a client to make an entry of a new data record;
   a determining unit configured to determine a database, of the plurality of databases, in which to store the new data record in response to the entry request, by use of the allocation history information and the allocation information after the change,
wherein:
the new data record includes at least one column or row from which a target column or a target row is predetermined to be used for determining the database in which to store the new data record; and
the determining unit includes:
   a database identifying unit configured to identify, from the plurality of databases by using the allocation history information and the allocation information after the change, one or more first databases that possibly store a data record having a value of the target column or the target row that is equal to a value of the target column or the target row of the new data record;
   a request transmitting unit configured to transmit a search request, to one or more first database servers having the one or more first databases, for searching for one or more matching data records having a value of the target column or the target row that is equal to the value of the target column or the target row of the new data record;
   a result receiving unit configured to receive respective one or more search results that are sent by the one or more first database servers as a search result of a search conducted in response to the search request, wherein the one or more search results indicate a number of the one or more matching data records;
   an entry transmitting unit configured to transmit the entry request requesting the entry of the new data record to a first selected database server, of the one or more first database servers, that sends a search result, of the one or more search results, indicating a number of the one or more matching data records equal to or greater than a predetermined number, and to transmit the entry request to a second selected database server, of the one or more first database servers, identified by using the allocation information after the change in response to a determination that the one or more search results sent by the one or more first database servers indicate that there are no matching data records; and a processing unit configured to execute at least the determining unit.

2. The server according to claim 1, wherein:

the allocation information indicates a function that performs a calculation onto the target column or the target row and a parameter used in the function;

the changing unit is further configured to change at least one of the function or the parameter indicated by the allocation information in response to a defined condition; and the database identifying unit includes:

a calculating unit configured to perform a calculation on the value of the target column or the target row by use of the allocation history information stored in the history storage unit and the allocation information after the change to obtain a process result; and an identifying unit configured to identify the one or more first databases that possibly store the data record having the value of the target column or the target row equal to the value of the target column or the target row of the new data record.

3. The server according to claim 2, wherein:

the predetermined partitioning method is hash partitioning;

the allocation information indicates a hash function that performs a calculation on the target column or the target row and a parameter used in the hash function;

the changing unit is further configured to change at least one of the hash function or the parameter indicated by the allocation information in response to the defined condition;

the calculating unit is further configured to perform calculations by using a first hash function indicated by the allocation history information, and by using a second hash function and a parameter indicated by the allocation information after the change to obtain calculated hash values; and the identifying unit is further configured to identify the one or more first databases that possibly store the data record having the value of the target column or the target row equal to the value of the target column or the target row of the new data record based on the calculated hash values.

4. The server according to claim 3, wherein:

the calculated hash values establish a one-to-one correspondence with the plurality of databases; and the identifying unit is further configured to identify databases, of the plurality of databases, that correspond to the calculated hash values as the one or more first databases that possibly store the data record having the value of the target column or the target row equal to the value of the target column or the target row of the new data record.

5. The server according to claim 1, wherein:

the partitioning method is key range partitioning;

the allocation information indicates a range of the target column or the target row;

the changing unit is further configured to change the range indicated by the allocation information in response to the defined condition; and the identifying unit is further configured to identify the one or more first databases that possibly store the data record having the value of the target column or the target row equal to the value of the target column or the target row of the new data record by use of a range indicated by the allocation history information and a range indicated by the allocation information after the change.

6. The server according to claim 1, wherein the changing unit is further configured to change the allocation information in response to a determination that sizes of total data stored in the plurality of databases are not in balance or in response to a new database being added.

7. The server according to claim 1, wherein the data record includes the column or row for at least one of a document identifier, a title, an author, a date, or a division.

8. A data allocating method implemented in a coordinator server that includes a history storage unit that stores allocation history information which is allocation information used before a change of the allocation information and which is used to determine a database into which a data record is registered, wherein a table including the data record is partitioned into a plurality of databases including the database according to a partitioning method, the data allocating method comprising:

in the data record, including at least one column or row from which a target column or a target row is to be used for determining the database to store a new data record;

changing the allocation information of in response to issuance of an allocation change command;

receiving an entry request to make an entry of the new data record;

in response to the receiving the entry request, identifying, from the plurality of databases by using the allocation history information stored in the history storage unit and the allocation information after the change, at least one first database that possibly stores a data record having a value of the target column or the target row that is equal to a value of the target column or the target row of the new data record;

transmitting a search request, to at least one first database server having the at least one first database, for searching for data records having the value of the target column or the target row that is equal to the value of the target column or the target row of the new data record;

receiving at least one search result that is sent by the at least one first database server as a search result of a search conducted in response to the search request, the at least one search result respectively indicating a number of the data records having the value of the target column or the target row that is equal to the value of the target column or the target row of the new data record; and transmitting the entry request requesting the entry of the new data record to a first selected database server, of the at least one first database server, that sends a search result, of the at least one search result, indicating the number of data records as being equal to or greater than a predetermined number, and transmitting the entry request to a second selected database server, of the at least one first database server, identified by using the allocation information after the change in response to the at least one search result sent by the at least one first database server indicating that no data records have the value of the target column or the target row that is equal to the value of the target column or the target row of the new data record.

9. A computer program product having a non-transitory computer-readable medium including programmed instructions that, in response to execution by a computer provided in a coordinator server that includes a history storage unit that stores allocation history information comprising allocation information used before a change of the allocation information and which is used to determine a database into which a data record is registered, wherein a table including the data records is partitioned into a plurality of databases including the database according to a partitioning method, cause the computer to perform operations, including:

in the data record, including at least one column or row from which a target column or a target row is to be used for determining the database to store a new data record;

changing the allocation information in response to issuance of an allocation change command;

receiving an entry request to make an entry of the new data record;

in response to the receiving the entry request, identifying, from the plurality of databases by using the allocation history information stored in the history storage unit and the allocation information after the change, one or more first databases that possibly store a data record having a value of the target column or the target row that is equal to a value of the target column or the target row of the new data record;

transmitting a search request, to one or more first database servers having the one or more first databases, for searching for the data record having the value of the target column or the target row that is equal to the value of the target column or the target row of the new data record;

receiving one or more search results that are sent by the one or more first database servers as a search result of a search conducted in response to the search request, the one or more search results indicating a number of data records having the value of the target column or the target row that is equal to the value of the target column or the target row of the new data record; and transmitting the entry request requesting the entry of the new data record to a first selected database server, of the one or more first database servers, that sends a search result indicating the number of data records as being equal to or greater than a predetermined number, and transmitting the entry request to a second selected database server, of the one or more first database servers, identified by using the allocation information after the change in response to the one or more search results indicating that no data records have the value of the target column or the target row that is equal to the value of the target column or the target row of the new data record.

* * * * *